Patented Jan. 15, 1929.

1,698,985

UNITED STATES PATENT OFFICE.

WILLIAM A. BENDER, OF ROCHESTER, NEW YORK, ASSIGNOR TO CERTO CORPORATION, OF ROCHESTER, NEW YORK, A CORPORATION OF NEW YORK.

FRUIT PRODUCT.

No Drawing. Application filed July 20, 1927. Serial No. 207,318.

This invention relates to the purification and clarification of solutions containing tannin, such as fruit juices or extracts and, in particular, of pectin solutions prepared from fruits such as apples. The invention is described herein, by way of illustration, as adapted for use in purifying fruit pectin solutions, but can be applied generally to any solution containing tannin.

Fruits contain natural tannin and acid in varying quantities, as well as various coloring principles associated with tannin. The darkening of fruit juices or extracts in contact with air is largely attributable to the tannin and tannin complexes.

In the preparation of pectin from fruits, such as apples for example (U. S. Patent 1,082,682), the apples are desugared by subjection to pressure or water-diffusion and the residual pulp is then cooked, usually with addition of a suitable organic acid. The cooked mass is then pressed to yield a weak solution of pectin. This solution is then treated with a diastatic enzyme (U. S. Patent 1,235,666) to remove the naturally occurring starch of the fruit, after which the solution is filtered bright and concentrated in vacuo. By using a suitable precipitant e. g. alcohol, substantially pure pectin can be precipitated from the weak liquor or its concentrate.

It is known that casein in solution and tannin in solution will mutually preciptate one another under certain conditions, but I have found in the treatment of pectin solutions that the addition of casein in solution is useless, as it produces a very fine and voluminous suspension that cannot be settled or filtered out. I have discovered that solid, powdered casein, when added to the above pectin extract obtained by pressing the cooked mass, remains undissolved therein and that in this condition it reacts with the tannin and tannin complexes contained therein to effect certain novel and valuable results as will appear below.

The addition of solid casein to the above pectin extract will cause a very satisfactory flocculation and settling of material held in fine suspension, leaving a fairly clear supernatent liquor which can be drawn off, treated with diastase and then filtered clear and bright. The casein particles in the sediment are found to be colored yellow and yellowish brown.

The above pectin extract contains a considerable amount of the natural coloring matter of the fruit. Such extract after concentration grows much darker on long standing. I have found that the treatment of the weak pectin solution with solid, powdered casein will remove approximately 50% of the natural coloring matter of the weak liquor, thus permitting the concentration of said liquor with a minimum of subsequent darkening due to ageing. If activated carbon is used in the process, the use of solid casein reduces to a minimum the amount of such carbon treatment necessary to decolorize.

In the diastatic treatment of the above pectin extract obtained after pressing, the natural fruit tannin exerts a decidedly inhibitive effect because it is an enzyme poison. Hence the removal of the tannin to any extent decreases the amount of diastase necessary to convert the starch into soluble carbohydrates. I have found that the treatment of the pectin extract with solid casein reduces by approximately 40% the amount of diastase that would otherwise be required for such starch conversion.

There are several kinds of casein on the market, e. g. acid precipitated casein, rennin casein, butter-milk casein. I have found that rennin casein is the best suited for pectin solutions in particular, as it has practically no deleterious effect on the jellifying power of the pectin solution, while other caseins by virtue of their method of preparation may cause some slight decrease in the jellifying power of the solution, although acting in every other respect like rennin casein in the clarification and purification of pectin solutions.

The following process as described for apples is exemplary and of course can be varied in details depending on raw materials and other factors without departing from the spirit of the invention.

Apples or apple products are subjected to pressure or water-diffusion to remove the saccharine or natural fruit juice (U. S. Patent No. 1,082,682). The residual plup is then processed or cooked for about 30 minutes with added water, slightly acidulated with a suitable organic acid such as lactic, and the cooked mass is then pressed to obtain the weak pectin solution. The pectin solution is cooled to about 100° F. and about 0.10% powdered casein is added to it in the following way: The dry, powdered casein, ground to pass through a 60 mesh screen, is moistened with water or weak pectin solution and then made into a creamy paste. This creamy mass is then added to the weak liquor and the mixture is stirred for five to ten minutes and then allowed to settle for about four to five days at about 90 to 100° F. The greater part of the casein settles out in a day and after the settling is complete the supernatant liquor is quite clear.

This liquor is then drawn off from above the sediment and treated with a diastatic enzyme to convert the starch into soluble carbohydrates (U. S. Patent No. 1,235,666). The pectin liquor may then be treated with a suitable activated carbon to remove as much of the residual color as desired. In any case it is finally filtered clear and bright, and concentrated in vacuo to any desired consistency.

Solid pectin can be precipitated from the finally filtered liquor; or after the solution has been concentrated in vacuo it may then be treated with a suitable precipitant.

It is evident that this treatment with solid casein can be applied to advantage to any fruit juice or any liquor containing tannin, which needs to be clarified, purified, and lightened in color.

I claim as my invention:

1. The process of clarifying solutions containing tannin, comprising adding solid casein to such solutions and then removing the resultant sediment therefrom.

2. The process of making a purified pectin solution comprising treating said solution with solid casein and removing the resultant sediment therefrom.

3. The process of preparing a purified pectin solution comprising processing fruit pulp with a weak lactic acid solution to obtain a pectin solution, treating such pectin solution with solid casein and then separating the clear liquor from the sediment.

4. The process of preparing a purified pectin solution comprising first removing the saccharine juice, then processing the residue to obtain the pectin solution, treating said solution with solid casein and separating the clear liquor from the sediment.

5. The process of making pectin comprising treating a pectin solution with solid casein, removing the resultant sediment therefrom and then treating the clarified solution with a diastatic enzyme.

6. The process of making pectin, comprising treating a pectin solution with solid casein, removing the resultant sediment therefrom and then treating the clarified solution with an activated carbon.

7. The process of preparing a clarified pectin solution comprising treating a pectin solution with solid casein, separating the clear liquor from the sediment, treating the clarified liquor with a diastatic enzyme, subjecting the treated liquor to the action of an activated carbon, filtering and finally concentrating the solution.

8. The process of making pectin, comprising treating a pectin solution with solid casein, removing the resultant sediment therefrom and precipitating the pectin.

9. The process of making pectin, comprising treating a pectin solution with solid casein removing the resultant sediment therefrom filtering the product, concentrating the filtered solution in vacuo and then precipitating the pectin.

10. The process of preparing a clarified pectin solution, comprising removing a saccharine juice, processing the residue to obtain the pectin solution, treating said solution with solid casein, separating the clear liquor from the sediment, treating the clarified liquor with a diastatic enzyme, filtering and then concentrating in vacuo.

11. The process of preparing a clarified fruit pectin solution, comprising first removing the saccharine juice from the fruit, then processing the fruit pulp with a weak organic acid solution to obtain the pectin solution, treating said solution with solid casein, separating the clear liquor from the sedment, treating the clarified liquor with a diastatic enzyme, then subjecting the same to the action of activated carbon, filtering and concentrating the liquor in vacuo and then precipitating the pectin.

WILLIAM A. BENDER.